May 17, 1966  V. R. HINTZE ETAL  3,251,433
STEERING SYSTEM FOR WHEELED VEHICLE
Filed Sept. 30, 1963  2 Sheets-Sheet 1

Inventors:
Vernon R. Hintze
Gerald R. Lamer
By Bair, Freeman & Molinare Attys

May 17, 1966  V. R. HINTZE ETAL  3,251,433
STEERING SYSTEM FOR WHEELED VEHICLE
Filed Sept. 30, 1963  2 Sheets-Sheet 2
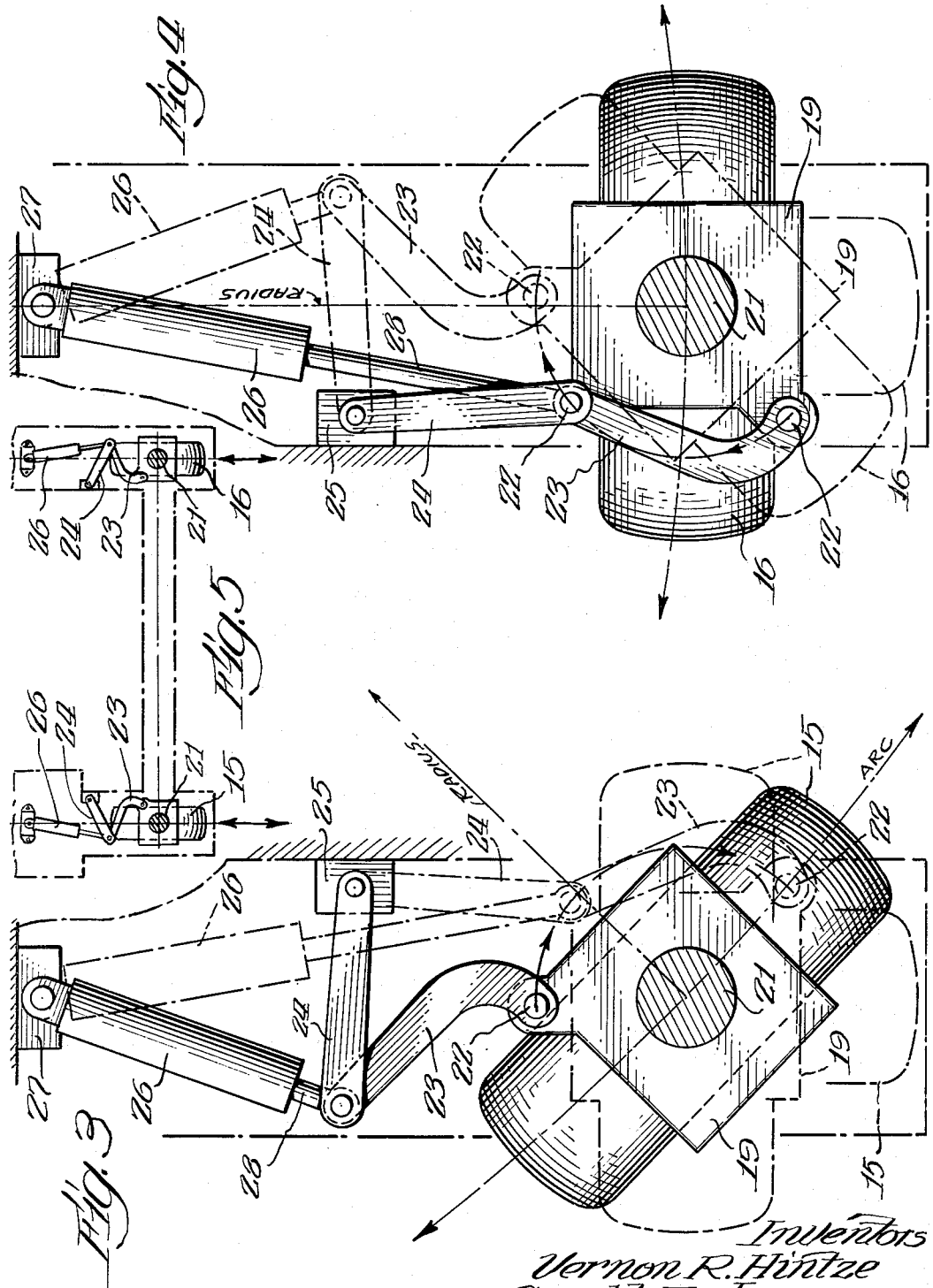
Inventors
Vernon R. Hintze
Gerald R. Lamer
By Baer, Freeman & Molinare Att'ys

United States Patent Office 3,251,433
Patented May 17, 1966

3,251,433
STEERING SYSTEM FOR WHEELED VEHICLE
Vernon R. Hintze and Gerald P. Lamer, Wausau, Wis., assignors to Drott Manufacturing Corporation, Milwaukee, Wis., a corporation of Wisconsin
Filed Sept. 30, 1963, Ser. No. 312,642
3 Claims. (Cl. 180—79.2)

This invention relates to steering systems and more particularly to a system for steering a self-propelled vehicle of the straddle type.

Straddle type vehicles have commonly been provided with hydraulic steering systems by which the steerable wheels thereof are turned through extensible and contractible cylinder and piston units pivoted between the frame of the vehicle and brackets on which the steerable wheels are mounted. The cylinder and piston units on opposite sides of the vehicle are connected either mechanically or hydraulically to produce equal movements in opposite directions for proper steering of the vehicle wheels. Vehicles of this type are more particularly disclosed and claimed in the patents to Baudhuin No. 3,075,603 and Re. 25,280.

While such steering systems are extremely satisfactory for normal use, there are occasions when greater maneuverability is required than they can achieve. For example, it may be desirable to turn the steerable wheels through angles up to 90° from their normal straight ahead position so that the vehicle can turn about one of its fixed wheels as a pivot. This degree of turning movement cannot be accomplished with direct connected cylinder and piston units as heretofore utilized.

It is, accordingly, one of the objects of the present invention to provide a steering system in which the steerable wheels can be turned through angles up to and including 90° from their normal straight ahead position.

Another object is to provide a steering system in which steering linkage is utilized including an arm pivoted to the vehicle frame and connected through a link to the steerable wheel to turn it. The arm can be swung by means of hydraulic cylinder and piston units pivoted between the frame and the arm.

According to a feature of the invention the linkage and hydraulic actuating units are so constructed and connected as to turn the steerable wheels at opposite sides of the vehicle through different angles to maintain proper rolling of both wheels in either direction and in all angular positions.

The above and other objections and advantages of the invention will be more readily apparent from the following description when read in connection with the accompanying drawings in which FIG. 1 is a perspective view of a self-propelled vehicle embodying the invention;

FIGS. 3 and 4 are enlarged views illustrating the steering linkage and showing the wheels in different angular positions; and FIG. 5 is a partial view similar to FIG. 2 showing the wheels in their straight ahead position.

Figure 1:
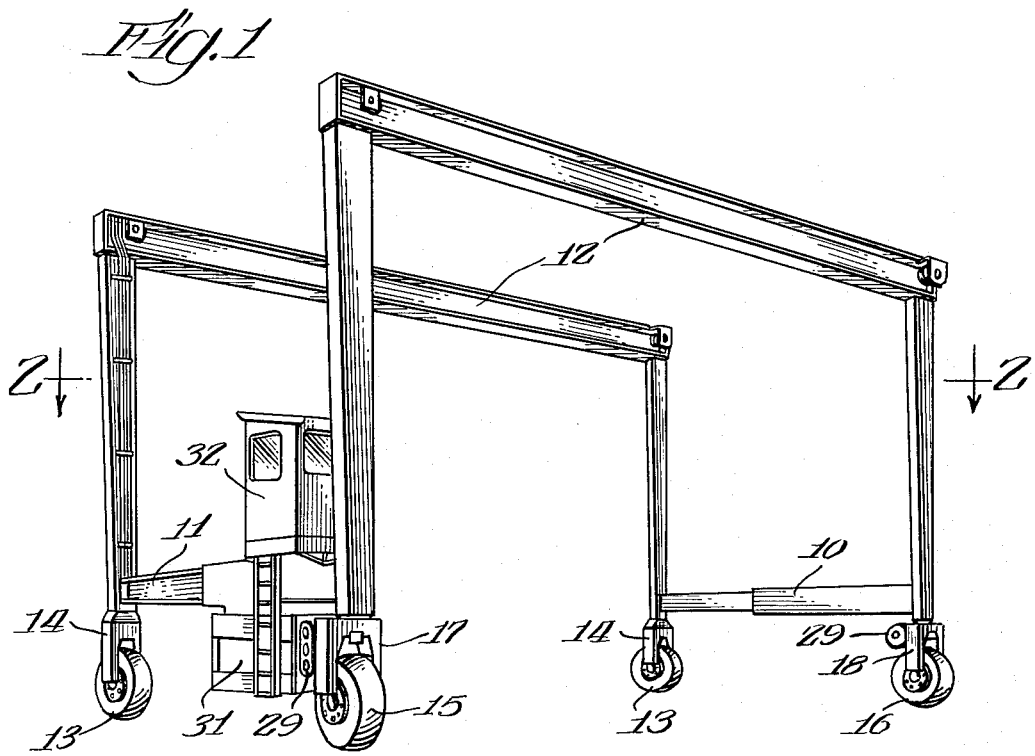

The steering system of the invention is illustrated in FIG. 1 as being applied to a straddle type vehicle having spaced side frames 10 and 11 connected by U-shaped members 12. It will be understood that the bridge members may carry winches or similar lifting devices to engage and pick up a load straddled by the vehicle and to transport it. The vehicle is supported on two fixed wheels 13 which are rotatably mounted in yokes 14 secured to two of the corners of the vehicle at what is normally the front end thereof. At the rear end of the vehicle steerable wheels 15 and 16 are rotatably mounted in yokes 17 and 18 which are journalled about vertical axes in the vehicle frame for turning movement. The yokes are carried by brackets 19 as best seen in FIGS. 2 to 5, which in turn are supported on vertical shafts 21 journalled in the frame to provide for turning of the wheels 15 and 16.

For turning the wheels 15 and 16 each of the brackets 19 is formed at one corner with a pivot connection 22 to which one end of a link 23 is pivoted. The links 23 are preferably curved as shown to provide clearance for the pivotal mountings of the wheels. The opposite ends of the links 23 are pivoted to the free ends of levers 24 which are pivoted at one end to supporting brackets 25 on the frame of the vehicle. As seen in FIGS. 2 to 5 the levers 24 project outwardly from the sides of the vehicle's frame and swing in horizontal planes.

The levers 24 are turned by hydraulic cylinder and piston units indicated generally at 26 which are pivoted at one end on supporting brackets 27 on the vehicle frame and at their other ends to the free ends of the levers 24. As shown each of the units 26 is formed by a cylinder pivoted to the bracket 27 having a piston therein whose piston rod 28 may be extended from or retracted into the cylinder and which is pivoted to the free end of the corresponding lever 24.

The cylinders 26 are connected in a hydraulic system similar to that shown in Baudhuin et al. Re. 25,280, so that when one piston rod is extended the opposite piston rod will be retracted a similar amount. In this way the wheels 15 and 16 will be properly turned to effect turning of the vehicle in one direction or the other as actuating fluid is supplied to one end or the other of the cylinders 26.

The normal straight ahead position of the wheels and steering linkage is illustrated in FIG. 5. In this position it will be noted that both of the levers 24 angle rearwardly from the frame to form an acute angle to the actuating units 26. The links 23 extend at acute angles between the free ends of the levers 24 and the pivot points 22 on the steering wheel brackets.

Figure 2:
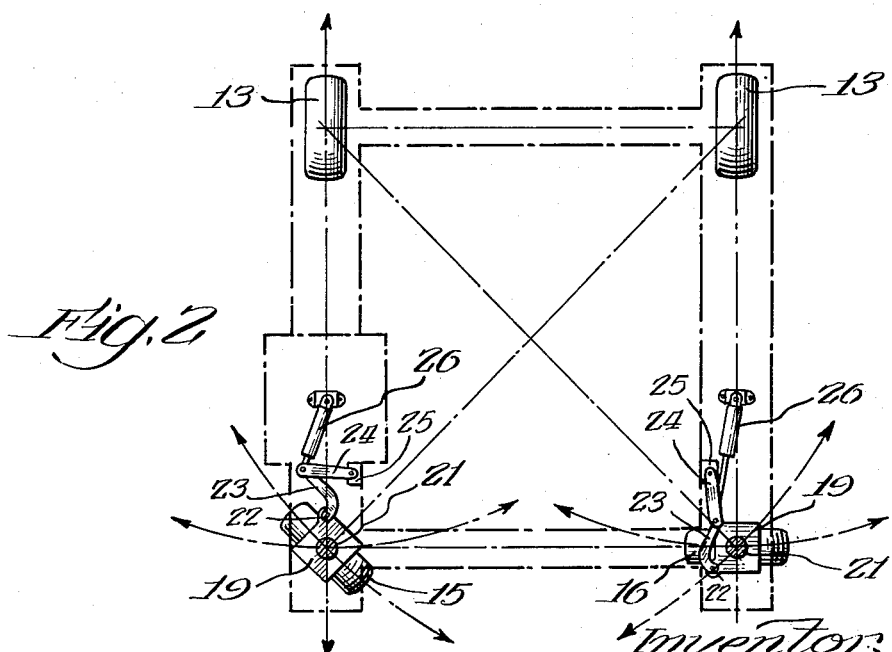
FIG. 2 is a diagrammatic view illustrating the steering mechanism.

FIGS. 2, 3 and 4 illustrate in full lines the position of the steerable wheels when turned to their extreme position for pivoting of the vehicle about the right front wheel 13. To achieve this position the actuating unit 26 connected to the right rear wheel is extended to the maximum amount possible while the actuating unit connected to the left rear wheel is fully retracted. This movement will cause the right rear wheel to turn counterclockwise until it lies at an angle of 90° with its normal straight ahead position. It will be seen that at this time the lever 24 extends substantially straight rearwardly from its mounting bracket 25 and that the link 23 due to its configuration clears the pivotal axis for the wheel. At the same time the left rear wheel is turned counterclockwise through a smaller angle due to retraction of its actuating unit until its plane lies normal to a radius through the center of the right fixed wheel 13. At this time power applied to the steerable wheels will cause the entire vehicle to pivot around the right fixed wheel 13 with the steerable wheels 15 and 16 rolling properly over the ground.

For turning about the left front wheel 13 operation of the actuating units is reversed as illustrated in dot-dash lines in FIGS. 3 and 4. In this position the left hand actuating unit 26 is extended while the right hand actuating unit 26 is retracted to turn the left steerable wheel 15 to a position at right angles to its normal straight ahead position with the right wheel 16 being turned to a position in which its plane is at right angles to a radius through the left fixed wheel 13. In this position the vehicle will pivot about the left fixed wheel 13. It will be understood, of course, that any intermediate positions could be achieved for steering in the usual manner at angles less than the extreme angular positions described above.

Preferably the steerable wheels 15 and 16 are power driven so that the sharp angular turning as described above can be achieved. For this purpose hydraulic motors 29 are mounted on the brackets 19 or yokes 18 and are supplied with operating fluid from a pump driven by an engine 31 mounted on the frame. The engine is preferably mounted at one side of the frame adjacent to an operator's compartment 32 from which the vehicle can be controlled. Since this portion of the mechanism forms no part of the invention and is shown in the patents referred to above, it will not be described more fully herein.

While one embodiment of the invention has been shown and described in detail it will be understood that this is for the purposes of illustration only and is not to be taken as a definition of the scope of the invention, reference being had for this purpose to the appended claims.

What is claimed is:

1. A steering system for a wheeled vehicle having a frame including spaced U-shaped bridge members interconnected by side members, two wheels rotatably mounted on the frame on a common fixed axis and two steerable wheels mounted on the frame for turning about substantially vertical axes and being spaced on a line parallel to and spaced from the common fixed axis, the steering system comprising a pair of arms pivoted on the frame adjacent to the steerable wheels, respectively, and extending at acute angles to the frame length in opposite directions from their pivots, links connecting the free ends of the arms to the steerable wheels and joining the arms at angles other than right angles when the steerable wheels are in a straight ahead position, respectively, to turn the wheels and linearly extensible and contractible actuating devices pivoted at one end to the frame and at the other end to the arms, respectively, and operable simultaneously through equal distances in opposite directions to turn the wheels in the same direction through different angles.

2. The steering system of claim 1 in which the actuating devices lie at acute angles to the length of the frame angling in opposite directions from the frame and joining the arms at angles other than right angles when the steerable wheels are in a straight ahead position.

3. A steering system for a wheeled vehicle having a rectangular frame, two wheels rotatable on fixed aligned axes at one end of the frame, steerable wheel brackets rotatable on spaced vertical axes at the other end of the frame, and steerable wheels rotatably mounted in the brackets, the steering system comprising a pair of arms pivoted on the frame on vertical pivots adjacent to the brackets, respectively, the arms lying between the fixed and steerable wheels lengthwise of the frame and extending outwardly from opposite sides of the frame, links connecting the free ends of the arms to points on the brackets spaced from the vertical axes of the brackets toward the fixed wheels and at the insides of the steerable wheels when the steerable wheels are in a straight ahead position parallel to the fixed wheels, and extensible and contractible actuating devices pivoted at one end on the sides of the frame and at the other end to the free ends of the arms, respectively, the actuating devices lying at acute angles to the sides of the frame and to the arms when the steerable wheels are in said straight ahead position and moving simultaneously through equal distances in opposite directions to turn the wheels through different angles.

References Cited by the Examiner

UNITED STATES PATENTS

| | | | |
|---|---|---|---|
| 2,191,961 | 2/1940 | Howell | 280—95 |
| 2,909,298 | 10/1952 | Baudhuin | 214—396 |
| 2,916,099 | 12/1959 | Bergmann et al. | 180—79.2 |
| 3,153,544 | 10/1964 | Jung et al. | 280—95 |

KENNETH H. BETTS, *Primary Examiner.*

BENJAMIN HERSH, *Examiner.*

R. C. PODWIL, *Assistant Examiner.*